United States Patent
Wu et al.

(10) Patent No.: US 12,440,701 B2
(45) Date of Patent: Oct. 14, 2025

(54) METHOD AND DEVICE FOR CONTROLLING DOSE, AND MEDICAL EQUIPMENT

(71) Applicant: OUR UNITED CORPORATION, Xi'an (CN)

(72) Inventors: Yue Wu, Xi'an (CN); Hong Cheng, Xi'an (CN); Cheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 328 days.

(21) Appl. No.: 17/953,173

(22) Filed: Sep. 26, 2022

(65) Prior Publication Data
US 2023/0094939 A1 Mar. 30, 2023

(30) Foreign Application Priority Data
Sep. 26, 2021 (CN) .......................... 202111131501.X (51) Int. Cl.
*A61N 5/10* (2006.01)
*G16H 20/40* (2018.01)
*G16H 40/63* (2018.01)

(52) U.S. Cl.
CPC .......... *A61N 5/1067* (2013.01); *A61N 5/103* (2013.01); *A61N 5/1071* (2013.01); *G16H 20/40* (2018.01); *G16H 40/63* (2018.01)

(58) Field of Classification Search
None
See application file for complete search history.

(56) References Cited

U.S. PATENT DOCUMENTS

| | | | |
|---|---|---|---|
| 7,804,935 B2 * | 9/2010 | Yin | A61N 5/1031 378/65 |
| 8,139,714 B1 * | 3/2012 | Sahadevan | A61N 5/1084 378/65 |
| 8,173,983 B1 * | 5/2012 | Sahadevan | A61N 5/1084 250/341.7 |
| 9,089,696 B2 * | 7/2015 | Verhaegen | A61N 5/1047 |
| 9,468,395 B2 * | 10/2016 | Fontius | A61B 6/5264 |
| 9,757,084 B2 * | 9/2017 | Sgouros | A61N 5/1039 |
| 9,987,504 B2 * | 6/2018 | Nord | A61N 5/103 |
| 10,252,081 B2 * | 4/2019 | Kauppinen | A61N 5/1042 |
| 10,265,543 B2 * | 4/2019 | Bharat | A61N 5/1031 |
| 10,384,080 B2 * | 8/2019 | Eriksson | A61N 5/1031 |
| 10,434,338 B2 * | 10/2019 | Sayeed | A61N 5/1039 |
| 10,441,811 B2 * | 10/2019 | Isola | G06N 3/12 |

(Continued)

FOREIGN PATENT DOCUMENTS

EP 3628372 A1 * 4/2020 ........... A61N 5/1031

*Primary Examiner* — David P Porta
*Assistant Examiner* — Djura Malevic
(74) *Attorney, Agent, or Firm* — Knobbe, Martens, Olson & Bear, LLP (57) ABSTRACT

Provided is a method controlling a dose. The method includes: acquiring a therapy plan; dividing each of the plurality of dose control points in the therapy plan into a plurality of refined control points, wherein each of the plurality of refined control points corresponds to a target dose; performing the therapy plan, and performing a real-time statistical collection on an actual dose; and adjusting, based on a target dose and the actual dose at a refined control point that is executed, a target dose at a refined control point that is not executed in real time.

16 Claims, 6 Drawing Sheets

(56) References Cited

U.S. PATENT DOCUMENTS

| | | | | |
|---|---|---|---|---|
| 10,449,388 B2* | 10/2019 | Yin | | A61N 5/103 |
| 10,456,600 B2* | 10/2019 | Owens | | A61N 5/1081 |
| 10,549,121 B2* | 2/2020 | Wu | | A61N 5/1031 |
| 10,589,127 B2* | 3/2020 | Nord | | A61N 5/103 |
| 10,674,973 B2* | 6/2020 | Chu | | A61N 5/1049 |
| 10,675,483 B2* | 6/2020 | Vik | | G16H 50/30 |
| 10,762,167 B2* | 9/2020 | Hartman | | A61N 5/103 |
| 10,806,949 B2* | 10/2020 | Li | | A61N 5/1082 |
| 10,806,950 B2* | 10/2020 | Fahrig | | A61N 5/1078 |
| 10,850,123 B2* | 12/2020 | Liu | | A61N 5/1031 |
| 11,132,798 B2* | 9/2021 | Yan | | A61B 6/00 |
| 11,135,450 B2* | 10/2021 | Yan | | A61N 5/1067 |
| 11,147,988 B2* | 10/2021 | Li | | A61N 5/00 |
| 11,191,978 B2* | 12/2021 | Kauppinen | | A61N 5/10 |
| 11,191,979 B2* | 12/2021 | Nord | | A61N 5/1071 |
| 11,278,737 B2* | 3/2022 | Peltola | | G06F 17/10 |
| 11,331,516 B2* | 5/2022 | Liu | | A61N 5/103 |
| 11,590,362 B2* | 2/2023 | Harju | | A61N 5/1031 |
| 11,633,624 B2* | 4/2023 | Heese | | G16H 40/20 |
| | | | | 378/65 |
| 11,915,346 B2* | 2/2024 | Mason | | G06T 11/005 |
| 12,040,070 B2* | 7/2024 | Yan | | G16H 50/20 |
| 2010/0012829 A1* | 1/2010 | Islam | | G01T 1/2935 |
| | | | | 250/252.1 |
| 2012/0076271 A1* | 3/2012 | Yan | | A61N 5/1049 |
| | | | | 378/65 |
| 2013/0197878 A1* | 8/2013 | Fiege | | G06F 30/20 |
| | | | | 703/2 |
| 2014/0105355 A1* | 4/2014 | Toimela | | A61N 5/1064 |
| | | | | 382/132 |
| 2015/0141733 A1* | 5/2015 | Kumar | | A61N 5/1031 |
| | | | | 600/1 |
| 2015/0224342 A1* | 8/2015 | Baltes | | A61N 5/1045 |
| | | | | 378/62 |
| 2015/0306423 A1* | 10/2015 | Bharat | | A61B 8/4218 |
| | | | | 600/1 |
| 2016/0174921 A1* | 6/2016 | Wikler | | A61B 6/488 |
| | | | | 378/19 |
| 2016/0279444 A1* | 9/2016 | Schlosser | | A61N 5/1049 |
| 2016/0287906 A1* | 10/2016 | Nord | | A61N 5/103 |
| 2016/0310763 A1* | 10/2016 | Grady | | A61B 6/06 |
| 2017/0189715 A1* | 7/2017 | Isola | | G16H 20/40 |
| 2018/0078786 A1* | 3/2018 | Vik | | A61N 5/1045 |
| 2018/0250530 A1* | 9/2018 | Nord | | A61N 5/1071 |
| 2018/0304099 A1* | 10/2018 | Li | | A61B 5/0036 |
| 2019/0060669 A1* | 2/2019 | Stahl | | G16H 40/63 |
| 2019/0175945 A1* | 6/2019 | Yan | | A61N 5/1084 |
| 2019/0192880 A1* | 6/2019 | Hibbard | | G16H 30/20 |
| 2019/0217122 A1* | 7/2019 | Kauppinen | | A61N 5/1045 |
| 2019/0336793 A1* | 11/2019 | Zhou | | A61N 5/1081 |
| 2020/0234443 A1* | 7/2020 | Yan | | G06T 7/248 |
| 2021/0038913 A1* | 2/2021 | Liu | | A61N 5/1081 |
| 2021/0069527 A1* | 3/2021 | Peltola | | A61N 5/1031 |
| 2022/0176161 A1* | 6/2022 | Riad | | A61N 5/107 |
| 2023/0285776 A1* | 9/2023 | Lachaine | | A61N 5/1038 |

\* cited by examiner

METHOD AND DEVICE FOR CONTROLLING DOSE, AND MEDICAL EQUIPMENT

CROSS-REFERENCE TO RELATED APPLICATION

This application claims priority to Chinese Patent Application No. 202111131501.X filed on Sep. 26, 2021 and entitled "METHOD AND DEVICE FOR CONTROLLING DOSE, AND MEDICAL EQUIPMENT," and the disclosure of which is herein incorporated by reference in its entirety.

TECHNICAL FIELD

The present disclosure relates to the field of radiation therapy, and in particular, relates to a method and device for controlling a dose, and medical equipment.

BACKGROUND

In modern medicine, a radiation therapy is an important therapy manner for a malignant tumor. In the radiation therapy, the tumor is killed using high-energy radiations. The radiation therapy is generally performed by a radiation device, and the radiation device is a gamma knife, accelerator, proton knife, or the like. With the maturation of the radiation therapy technology, requirements of patients for dynamic therapy are increased, and requirements for an operation efficiency, accuracy, and stability of the dynamic therapy are increased. In existing radiation therapy, the therapy plan includes a plurality of dose control points, and the radiation device sequentially performs dose radiation at the plurality of dose control points to complete the radiation therapy.

SUMMARY

Embodiments of the present disclosure provide a method and device for controlling a dose, and medical equipment. The technical solutions are as follows.

According to some embodiments of the present disclosure, a method for controlling a dose is provided in the embodiments of the present disclosure. The method includes:
  acquiring a therapy plan, wherein the therapy plan includes a plurality of dose control points;
  dividing each of the plurality of dose control points in the therapy plan into a plurality of refined control points, wherein each of the plurality of refined control points corresponds to a target dose;
  performing the therapy plan, and performing a real-time statistical collection on an actual dose; and
  adjusting, based on a target dose and the actual dose at a refined control point that is executed, a target dose at a refined control point that is not executed in real time.

According to some embodiments of the present disclosure, an apparatus for controlling a dose is provided in the embodiments of the present disclosure. The apparatus includes: an acquiring module, a dividing module, and a processing module;
  the acquiring module is configured to acquire a therapy plan, wherein the therapy plan includes a plurality of dose control points;
  the dividing module is configured to divide each of the plurality of dose control points in the therapy plan into a plurality of refined control points, wherein each of the plurality of refined control points corresponds to a target dose;
  the processing module is configured to perform the therapy plan, and perform a real-time statistical collection on an actual dose; and
  the processing module is further configured to adjust, based on a target dose and the actual dose at a refined control point that is executed, a target dose at a refined control point that is not executed in real time.

According to some embodiments of the present disclosure, medical equipment is provided in the embodiments of the present disclosure. The medical equipment includes: a processor, and a memory configured to store one or more programs or instructions executable on the processor, wherein the processor, when loading and executing the one or more programs or instructions, is caused to perform the method according to above embodiments.

According to some embodiments of the present disclosure, a non-transitory computer-readable storage medium is provided in the embodiments of the present disclosure. The non-transitory computer-readable storage medium stores one or more programs or instructions, wherein the one or more programs or instructions, when loaded and executed by a processor, cause the processor to perform the method according to above embodiments.

According to some embodiments of the present disclosure, a chip is provided in the embodiments of the present disclosure. The chip includes a processor and a communication interface, wherein the communication interface is coupled to the processor, and the processor, when loading and executing one or more programs or instructions, is caused to perform the method according to above embodiments.

DETAILED DESCRIPTION

The technical solutions of the embodiments of the present disclosure are clearly described hereinafter in combination with the accompanying drawings of the embodiments of the present disclosure. The embodiments described hereinafter are merely part, but not all of the embodiments of the present disclosure. All other embodiments derived by those skilled in the art, based on the embodiments of the present disclosure, are within the scope of the present disclosure.

In the specification and claims of the present disclosure, the terms "first," "second," and the like are merely used to distinguish similar objects, and are not to be construed to indicate specific sequence or order. It is noted that, the data used in this way is exchangeable, such that the embodiments of the present disclosure can be implemented in the sequence other than the sequence illustrated in accompanying drawings or described herein. In addition, objects distinguished by the terms "first," "second," and the like are generally the same kind, and the terms "first," "second," and the like are not used to limit numbers of the objects. For example, a first object may be one or more. In addition, the term "and/or" in the specification of the embodiments of the present disclosure and claims indicates at least one of the connected objects, and the symbol "I" generally indicates a "or" relationship between the connected objects.

The method for controlling the dose in the embodiments of the present disclosure is applicable to the medical equipment, for example, equipment for radiation therapy. The apparatus for controlling the dose is the medical equipment, or device of module in the medical equipment.

Figure 1:
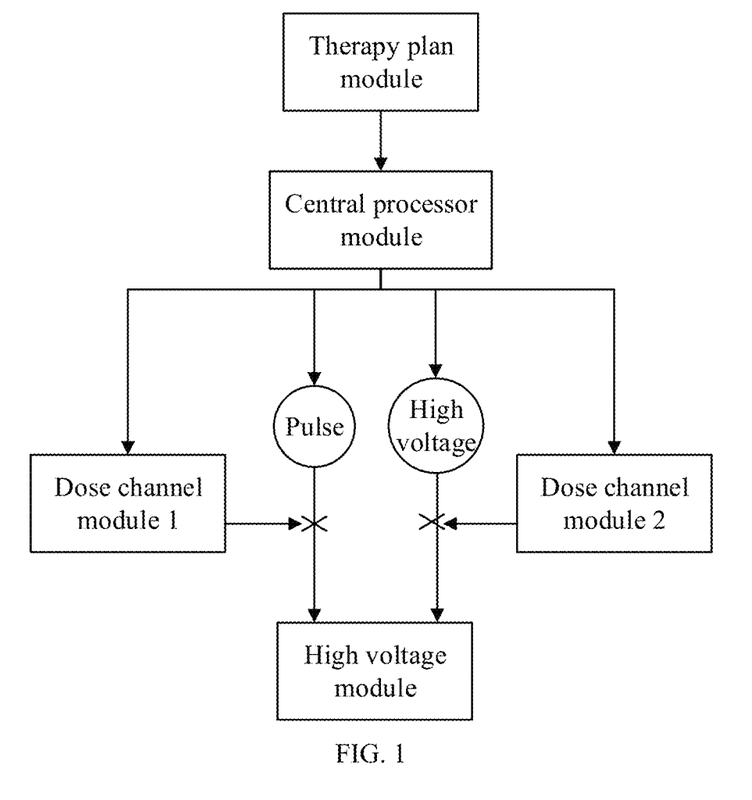
FIG. 1 is a schematic structural diagram of medical equipment according to some embodiments of the present disclosure.

In some embodiments, as shown in FIG. 1, the medical equipment includes a therapy plan module, a central processor module, a dose channel module, a high voltage module, and the like. The dose channel module includes a dose channel module 1 and a dose channel module 2. The therapy plan module is connected to the central processor module, the central processor module is connected to the dose channel module 1 and the dose channel module 2, and the dose channel module 1 and the dose channel module 2 are connected to the high voltage module.

The dose channel module 1 and the dose channel module 2 are connected to control the medical equipment to stop outputting the dose. For a pulse input of the high voltage module, the dose channel module 1 is configured to switch off the pulse input of the high voltage module. For the high voltage of the high voltage module, the dose channel module 2 is configured to switch off the high voltage of the high voltage module.

In the embodiments of the present disclosure, the apparatus for controlling the dose performs the method for controlling the dose in the embodiments of the present disclosure by the therapy plan module, the central processor module, the dose channel module, and the high voltage module.

The therapy plan module generates a therapy plan, and sends the therapy plan to the central processor module. The therapy plan includes a plurality of dose control points. The central processor module divides each of the plurality of dose control points in the therapy plan into a plurality of refined control points. For each of the plurality of refined control points, the dose channel module 1 switches off the pulse in response to an actually executed dose (that is, an actual dose) at a refined control point reaching a target dose corresponding to the refined control point, and executes a next refined control point. The dose channel module 1 switches off the pulse in response to an actually executed dose of the next refined control point reaching a target dose corresponding to the next refined control point, and so on until the dose radiation is performed on all refined control points, such that the therapy is completed.

The method for controlling the dose in the embodiments of the present disclosure is described in detail hereinafter by the embodiments and the application scenes in conjunction with the accompanying drawings.

In conventional therapy plan, the precision and accuracy of controlling the dose in the therapy process are less. For example, in continuously executing the dose control points in the therapy plan, a control delay occurs in task periods of a controller as the task periods of the controller are controlled by a software, for example, a delay of 2 ms or 10 ms. In the control delay period, radiation overshooting is emerged as the radiation cannot be interrupted. For example, in the control delay period, the radiation dose ranges from 0.3 cGy to 0.8 cGy. cGy is a dose unit of the radiation therapy, and 1 cGy is equivalent to 1 rad.

In the embodiments of the present disclosure, in the therapy process, a control signal of the controller is switched off on a highly responsive hardware by the dose channel module, so as to precisely control the radiation dose. The dose control point in the therapy plan is subdivided by a software to improve the precision of performing the therapy plan. A pulse overshooting value is switched off by the dose channel module, and a compensation is performed on a next refined control point, so as to improve the precision of executing the refined control point. As such, the precision and accuracy of controlling the dose in performing the therapy plan are improved in the embodiments of the present disclosure.

The method for controlling the dose in the embodiments of the present disclosure is performed by the apparatus for controlling the dose, the medical equipment, or the controlling module for performing the method for controlling the dose in the apparatus for controlling the dose.

Figure 2:
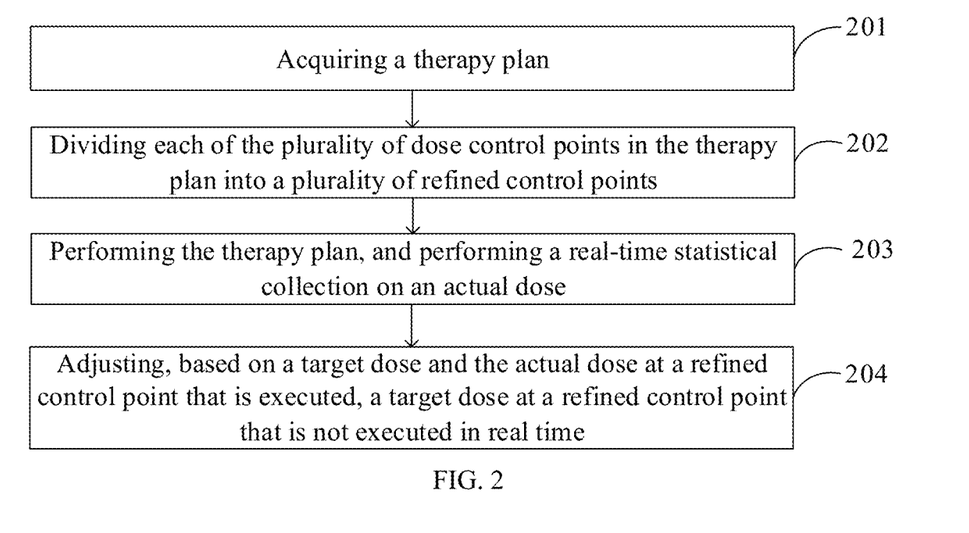
FIG. 2 is a flowchart of a method for controlling a dose according to some embodiments of the present disclosure.

A method for controlling a dose is provided in the embodiments of the present disclosure. FIG. 2 is a flowchart of a method for controlling a dose according to some embodiments of the present disclosure. As shown in FIG. 2, the method for controlling the dose in the embodiments of the present disclosure includes S201 to S203.

In S201, a therapy plan is acquired.

It is noted that, the therapy plan is a therapy plan developed based on a shape and a position of a tumor in a patient, and the shape and the position of the tumor in the patient are determined based on a medical image of the patient prior to the therapy of the tumor in the patient. Based on the therapy plan, a plurality of angles of the radiation equipment for radiation, diameters of a collimator at different angles, positions of leaves of a multi-leaf grating, dose parameters of the radiation, and the like in the radiation therapy are determined, and the radiation plan is performed on the tumor based on the therapy plan.

The medical image for determining the shape and the position of the tumor in the patient includes at least one of images acquired by the medical imaging equipment, such as, a computed tomography (CT) equipment, a magnetic resonance imaging (MRI) equipment, a positron emission computed tomography (PET) equipment, and the like. That is, the medical image for determining the shape and the position of the tumor in the patient includes a CT image, a MRI image, and/or a PET image.

In the embodiments of the present disclosure, the therapy plan includes a plurality of dose control points, and each of the plurality of dose control points includes a gantry angle, an accumulated dose, positions of the leaves of the multi-leaf grating, and the like. The accumulated dose is an accumulated dose needing to be reached at the end of a current dose control point.

In S202, each of the plurality of dose control points in the therapy plan is divided into a plurality of refined control points.

In the embodiments of the present disclosure, each of the plurality of refined control points in the therapy plan corresponds to a target dose. The target dose is an accumulated dose needing to be reached at the end of a current dose control point.

It is noted that, for the plurality of dose control points in the therapy plan, a part of the plurality of dose control points are divided into the plurality of refined control points, and another part of the plurality of dose control points are not divided. Or, all of the plurality of dose control points are divided into the plurality of refined control points, and the embodiments of the present disclosure are merely illustrated and are not limited.

For example, in the device for controlling the dose, a first dose control point in the therapy plan is divided into at least two refined control points, a second dose control point in the therapy plan is divided into at least two refined control points, and so on until all dose control points in the therapy plan are divided.

The division is performed based on a target dose of a current dose control point and a target dose of a previous control point, and a difference value of the two target doses is uniformly divided, so as to perform the division and acquire a target dose of the refined control point.

It is noted that, the division is not necessary to be a uniform division in dividing, and the dose is divided based on actual therapy requirements. In some embodiments, the division is performed by interpolating, based on a target dose at a current dose control point and a target dose at a previous control point, a plurality of refined control points between two dose control points using an interpolation algorithm.

In S203, the therapy plan is performed, and a real-time statistical collection is performed on an actual dose.

In the embodiments of the present disclosure, in performing the dose radiation at each of the plurality of refined control points, the device for controlling the dose performs the real-time statistical collection on the actual dose at each of the plurality of refined control points, such that an opportunity of switching off the pulse at each of the plurality of refined control points is determined. The actual dose is an accumulated value from the start of the radiation therapy to the end of the current moment.

In S204, a target dose at a refined control point that is not executed is adjusted in real time based on a target dose and the actual dose at a refined control point that is executed.

A difference value at the current refined control point is determined based on acquired actual dose and a target dose at the current refined control point. The difference value represents the dose of extra or missing radiation at the current refined control point. Upon being determined, the difference value is compensated at the refined control point that is not executed. The compensation is performed at a next refined control point, or at a refined control point following several refined control points, which is not limited in the embodiments of the present disclosure.

The device for controlling the dose performs the dose radiation at a first refined control point, and switches off the pulse in response to an actual dose at the first refined control point reaching (that is, being equal to) a target dose corresponding to the first refined control point, that is, the dose radiation at the first refined control point is stopped. In this case, the statistical collection is performed on the actual dose at the first refined control point, and a dose to be compensated is determined based on the actual dose and the target dose at the refined control point. Then, the device for controlling the dose performs the dose radiation at a second refined control point, adjusts, based on the dose to be compensated, a target dose at the second refined control point, and switches off the pulse in response to an actual dose at the second refined control point reaching an adjusted target dose at the second refined control point. That is, the dose radiation at the second refined control point is stopped, and so on until the device for controlling the dose performs the dose radiation at a last refined control point and switches off the pulse in response to an actual dose at the last refined control point reaching a target dose corresponding to the last refined control point, that is, the dose radiation at the last refined control point is stopped, such that the therapy is completed.

It is noted that, the target dose is a dose needed to be actually reached at each refined control point and desired by the device for controlling the dose, that is, a threshold determination value to switch off the pulse at each refined control point, or a threshold determination value of completing the dose radiation at each refined control point.

The embodiments of the present disclosure provide a method for controlling a dose. Each of the plurality of dose control points in the therapy plan is divided into a plurality of refined control points, the therapy plan is performed, and a target dose at a refined control point that is not executed is adjusted in real time based on a target dose and the actual dose at a refined control point that is executed. In the solutions, each of the plurality of dose control points is divided into the plurality of refined control points, and the therapy plan is performed based on the plurality of refined control points, that is, the dose is controlled for each of the plurality of dose control points. As such, the precision of performing the therapy plan is improved by subdividing the dose control points in the case. The target dose at the refined control point that is not executed is adjusted based on the actual dose at the refined control point that is executed, such that the actual dose at each of the plurality of dose control points is precisely controlled, and the total actual dose in the therapy process is further controlled. Thus, the precision and the accuracy of controlling the dose in the therapy process is further improved.

Figure 3:
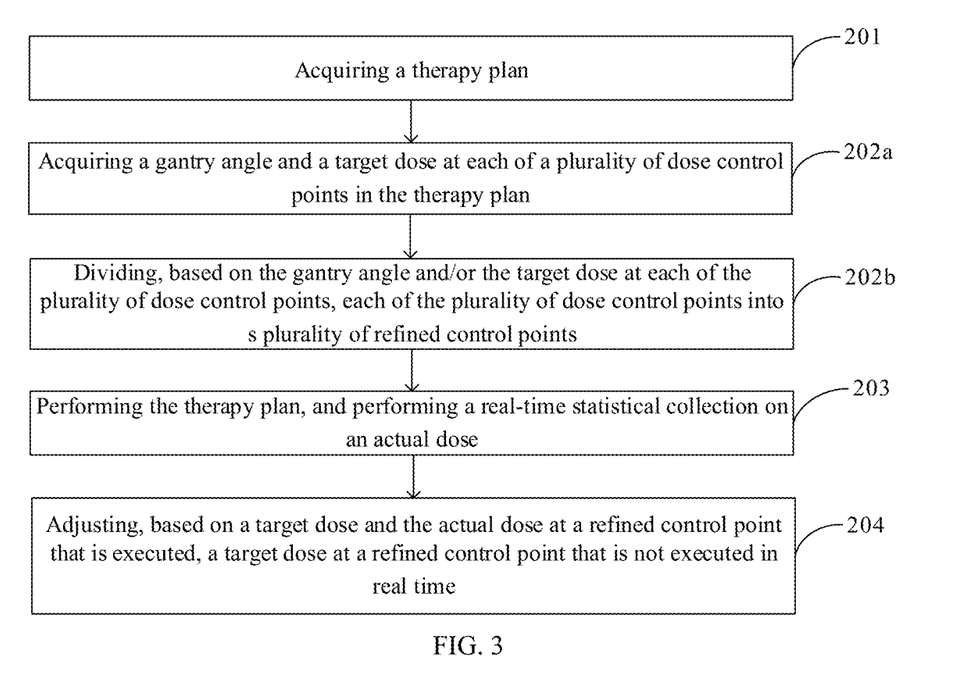
FIG. 3 is a flowchart of a method for controlling a dose according to some embodiments of the present disclosure.

In some embodiments of the present disclosure, in conjunction with FIG. 2, as shown in FIG. 3, S202 is implemented by following S202a and S202b.

In S202a, a gantry angle and a target dose at each of the plurality of dose control points in the therapy plan are acquired.

It is noted that, the gantry needs to rotate an angle range in a whole dynamic therapy plan, for example, a half circumference (180°), one circumference (360°), or two circumferences (720°). In the therapy plan, the dose control point is set every preset angle within the angle range, and each dose control point includes the gantry angle, the accumulated dose, the target dose, and the like. The target dose is a dose upper value needed to be reached at the dose control point in dose radiation.

In S202b, each of the plurality of dose control points is divided into the plurality of refined control points based on the gantry angle and/or the target dose at each of the plurality of dose control points.

In some embodiments of the present disclosure, each of the plurality of dose control points is divided only based on the target dose. In some embodiments, each of the plurality of dose control points is divided only based on the gantry angle. In some embodiments, each of the plurality of dose control points is divided based on the gantry angle and the target dose.

In the embodiments of the present disclosure, prior to therapy, the physicist or pharmacist develops the therapy plan of the patient based on the therapy plan module, and loads the therapy plan into a control system. The central processor module determines the speed at the control point based on the therapy plan, the rotation gantry, and the execution property of the multi-leaf grating and the dose system, and performs the linear interpolation to divide two adjacent dose control points into a plurality of refined control points. The central processor module performs the linear interpolation by an angle difference value between the two adjacent dose control points based on the execution property of the rotation gantry, so as to divide two adjacent dose control points into a plurality of refined control points.

In the embodiments of the present disclosure, the device for controlling the dose performs the dose radiation at the plurality of refined control points acquired by dividing each of the plurality of dose control points.

In some embodiments of the present disclosure, the device for controlling the dose divides all of the plurality of dose control points into the refined control points of the same number. In some embodiments, the device for controlling the dose divides all of the plurality of dose control points into the refined control points of the different numbers. In some embodiments, for all of the plurality of dose control points, the device for controlling the dose divides a part of the plurality of dose control points into the refined control points of the same number, and divides another part of the plurality of dose control points into the refined control points of the different numbers, which is determined based on actual case information and is not limited in the embodiments of the present disclosure.

It is noted that, the dose in the embodiments of the present disclosure is the dose, or a dose rate, or the dose includes the dose and the dose rate. The embodiments of the present disclosure are not intended to limit the dose provided that the dose parameter represents output dose at the refined control point.

Figure 4:
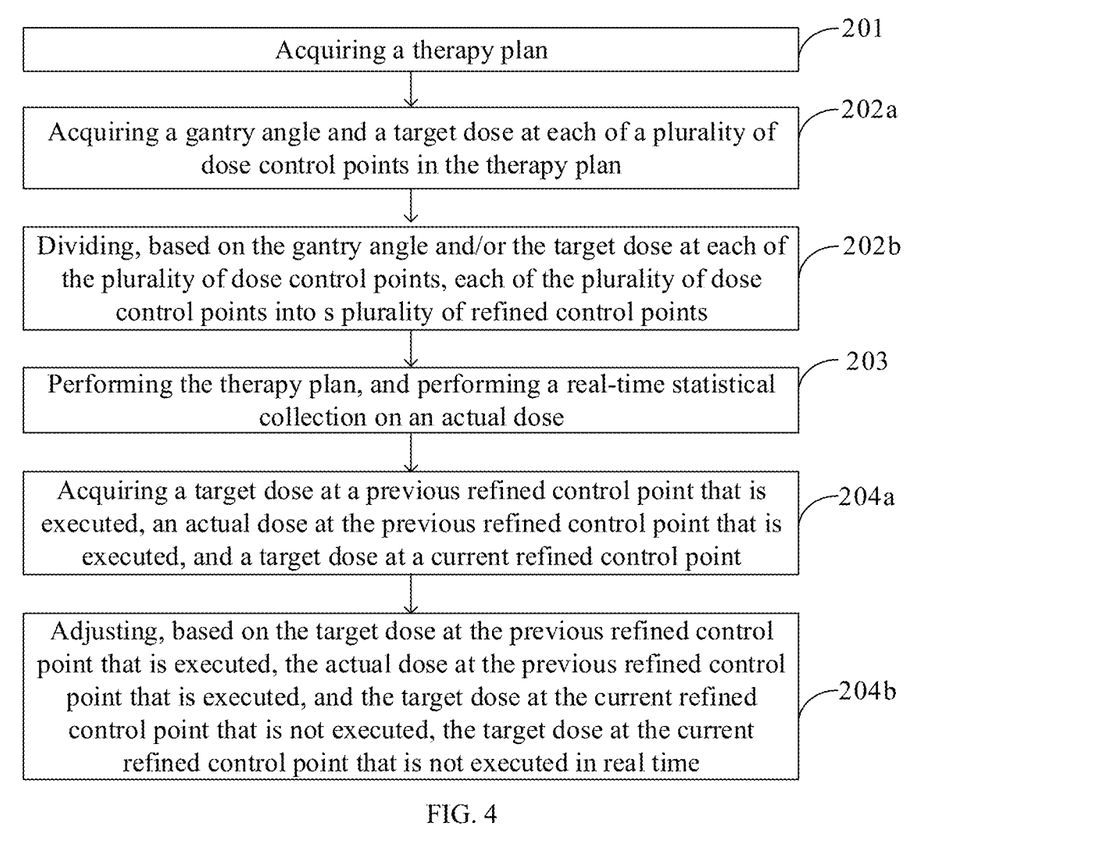
FIG. 4 is a flowchart of another method for controlling a dose according to some embodiments of the present disclosure.

In some embodiments of the present disclosure, in conjunction with FIG. 2, as shown in FIG. 3 and FIG. 4, the process of "adjusting, based on the target dose and the actual dose at the refined control point that is executed, the target dose at the refined control point that is not executed in real time" in S204 is implemented by following S204a and S204b.

In S204a, a target dose at a previous refined control point that is executed, an actual dose at the previous refined control point that is executed, and a target dose at a current refined control point are acquired.

In the embodiments of the present disclosure, in performing the dose radiation, for each of the plurality of refined control points, the device for controlling the dose switches off the pulse of the high voltage module in response to an actual dose at an $i^{th}$ refined control point reaching a target dose corresponding to the $i^{th}$ refined control point. In this case, the device for controlling the dose acquires a current actual dose after the pulse is switched off, and takes the current actual dose as the actual dose at the previous refined control point. The device for controlling the dose acquires, based on the therapy plan of the current patient, the target dose at the previous refined control point that is executed and the target dose at the current refined control point. i is 1, 2, . . . , N, and N is a number of the plurality of refined control points acquired by dividing all of the plurality of dose control points, and N is an integer greater than 1.

In S204b, the target dose at the current refined control point that is not executed is adjusted in real time based on the target dose at the previous refined control point that is executed, the actual dose at the previous refined control point that is executed, and the target dose at the current refined control point that is not executed.

In some embodiments of the present disclosure, for another refined control points in all of the plurality of refined control points, the device for controlling the dose adjusts, based on to target dose at a $j^{th}$ refined control point, a target dose corresponding to a $(j-1)^{th}$ refined control point, and an actual dose at the $(j-1)^{th}$ refined control point, a target dose corresponding to the $j^{th}$ refined control point. j is 2, 3, . . . , N−1.

It can be understood that, for another refined control points (that is, refined control points in all of the plurality of refined control points except a first refined control point and a last refined control point), the device for controlling the dose performs a dynamic dose compensation on the another refined control points, so as to determine the target doses at the another refined control points.

In some embodiments of the present disclosure, the target dose corresponding to the $j^{th}$ refined control point is equal to the target dose at the $j^{th}$ refined control point plus the target dose corresponding to the $(j-1)^{th}$ refined control point minus the actual dose at the $(j-1)^{th}$ refined control point.

In some embodiments, as shown in following Table 1, it is assumed that the therapy plan from the therapy plan module includes two dose control points: a dose control point a and a dose control point b. Taking the dose control point a as an example, for a refined control point 1, a refined control point 2, and a refined control point 3 of the dose control point a, the device for controlling the dose performs the dose radiation at the refined control point 1, and switches off the pulse in response to an actual dose at the refined control point 1 reaching a target dose 10 milliunits (Mu) corresponding to the refined control point 1. Then, the device for controlling the dose performs the dose radiation on the refined control point 2, and switches off the pulse in response to an actual dose at the refined control point 2 reaching a target dose 19.9 Mu corresponding to the refined control point 2. The device for controlling the dose performs the dose radiation at the refined control point 3, and switches off the pulse in response to an actual dose at the refined control point 3 reaching a target dose 29.7 Mu corresponding to the refined control point 3. The dose control point b is processed similarly, which is not repeated herein.

TABLE 1

| Dose control point | Dose at the dose control point (Mu) | Refined control point | Target dose (Mu) | Actual dose (Mu) | |
|---|---|---|---|---|---|
| a | 30 | 1 | 10 (no compensation) | 10.1 | extra 0.1 |
|  |  | 2 | 19.9 (20 − 0.1) | 20.2 | extra 0.3 |
|  |  | 3 | 29.7 (30 − 0.3) | 29.9 | extra 0.2 |
| b | 90 | 4 | 49.8 (50 − 0.2) | 49.6 | missing 0.2 |
|  |  | 5 | 70.2 (70 + 0.2) | 70.1 | missing 0.1 |
|  |  | 6 | 90 (no compensation) |  |  |

In some embodiments, in conjunction with Table 1, taking the refined control point 2 and the target dose at the refined control point 2 being 20 Mu as an example, the target dose corresponding to the refined control point 2 is equal to the target dose at the refined control point 2 plus the target dose corresponding to the refined control point 1 minus the actual dose at the refined control point 1, that is, the target dose corresponding to the refined control point 2 is equal to 20 plus 10 minus 10.1, that is, 19.9.

It is noted that, for each refined control point, the pulse has been emitted when the pulse is switched off in response to the actual dose at the refined control point reaching the corresponding target dose, that is, the dose of one pulse is extra at each refined control point. Thus, the target dose is acquired in above method, such that the total actual dose after the dose radiation is performed at all refined control points is not greater than the total dose.

In some embodiments of the present disclosure, for the plurality of refined control points of all of the plurality of dose control points, a target dose at the first refined control point and a target dose at the last refined control point are not adjusted.

Figure 5:
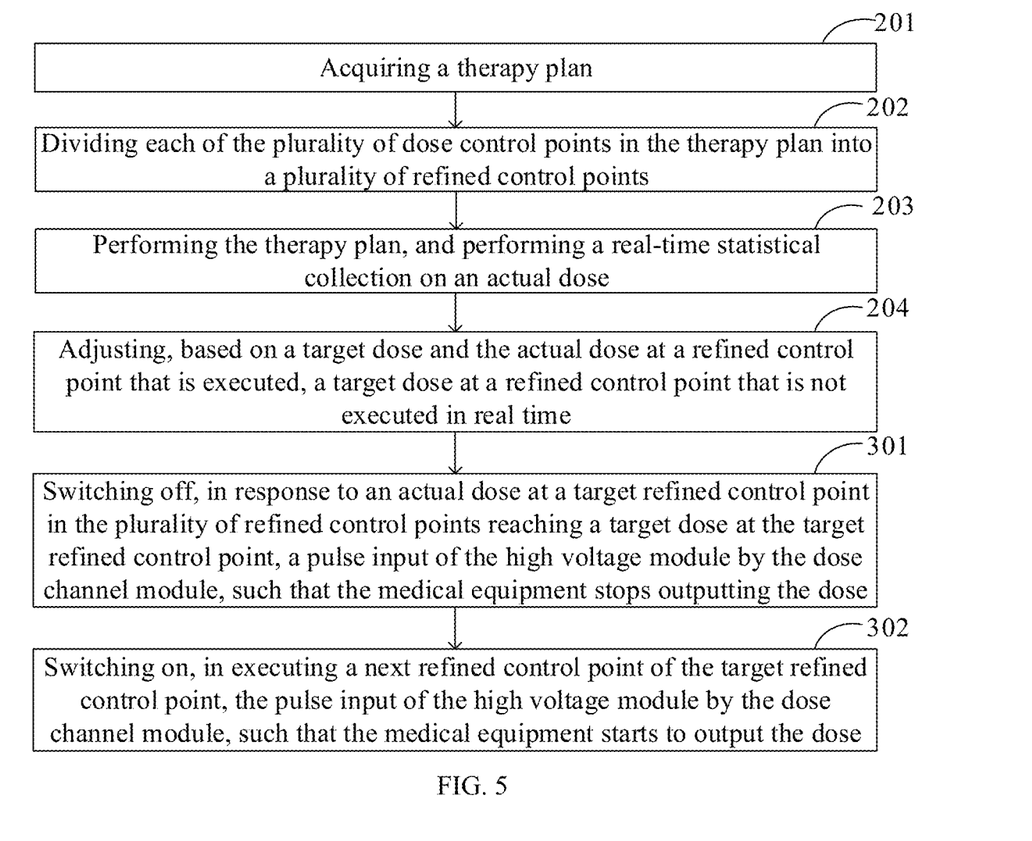
FIG. 5 is a flowchart of another method for controlling a dose according to some embodiments of the present disclosure.

In some embodiments of the present disclosure, in conjunction with FIG. 2, as shown in FIG. 5, the method for controlling the dose in the embodiments of the present disclosure further includes following S301 and S302.

In S301, a pulse input of the high voltage module is switched off by a dose channel module in response to an actual dose at a target refined control point in the plurality of refined control points reaching a target dose at the target refined control point, such that the medical equipment stops outputting the dose.

In the embodiments of the present disclosure, in performing the dose radiation, the device for controlling the dose performs the real-time statistical collection on the actual dose at each of the plurality of refined control points by the dose channel module in the medical equipment.

The dose channel module includes a first channel module (the dose channel module 1 in above embodiments) and a second channel module (the dose channel module 2 in above embodiments), and both the first channel module and the second channel module are configured to control the medical equipment to stop outputting the dose.

In some embodiments of the present disclosure, according to the description of the dose channel module 1 and the dose channel module 2, the first channel module is configured to switch off the pulse input of the high voltage module, and the second channel module is configured to switch off the high voltage of the high voltage module. The device for controlling the dose performs the real-time statistical collection on the actual dose at each of the plurality of refined control points by the first channel module. In the case that the actual dose at the target refined control point reaches to the target dose at the target refined control point, the device for controlling the dose switches off the pulse input of the high voltage module in the medical equipment by the first channel module, such that the medical equipment stops outputting the dose. It is noted that, in some embodiments, the device for controlling the dose switches off the high voltage of the high voltage module by the first channel module, and switches off the pulse input of the high voltage module the second channel module, which is not limited in the embodiments of the present disclosure.

In S302, the pulse input of the high voltage module is switched on by the dose channel module in executing a next refined control point of the target refined control point, such that the medical equipment starts to output the dose.

In the embodiments of the present disclosure, after the pulse is switched off at the $i^{th}$ refined control point, the device for controlling the dose switches on the pulse input of the high voltage module by the dose channel module (for example, the first channel module) in executing a $(i+1)^{th}$ refined control point, such that the dose radiation is performed at the $(i+1)^{th}$ refined control point.

In the embodiments of the present disclosure, the device for controlling the dose performs the real-time statistical collection on the actual dose at each of the plurality of refined control points by the dose channel module, such that the opportunity of switching off the pulse at each of the plurality of refined control points is determined. Thus, the radiation dose at each of the plurality of refined control points reaches to the target dose at each of the plurality of refined control points, and the precision and accuracy of the radiation dose at each of the plurality of refined control points are further ensured.

Figure 6:
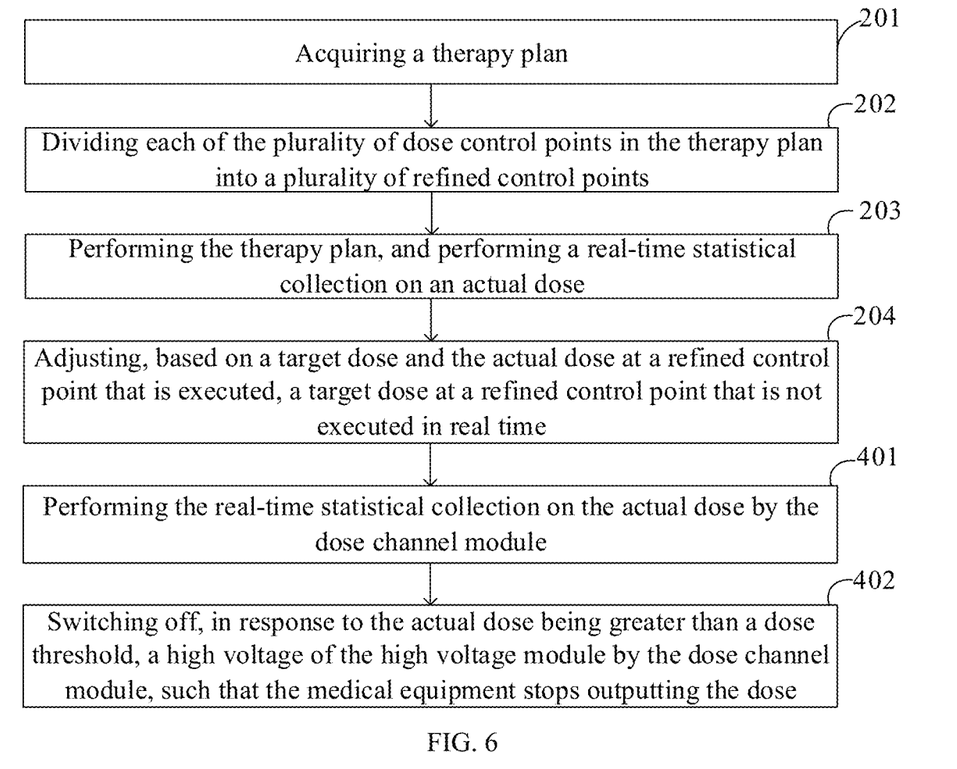
FIG. 6 is a flowchart of another method for controlling a dose according to some embodiments of the present disclosure.

In some embodiments of the present disclosure, in conjunction with FIG. 2, as shown in FIG. 6, the method for controlling the dose in the embodiments of the present disclosure further includes following S401 and S402.

In S401, the real-time statistical collection is performed on the actual dose by the dose channel module.

In S402, a high voltage of the high voltage module is switched off by the dose channel module in response to the actual dose being greater than a dose threshold, such that the medical equipment stops outputting the dose.

It can be understood that, in the therapy process, the dose channel module (for example, the second channel module) performs the real-time statistical collection on the total actual dose (that is, the actually accumulated dose). In the case that the total actual dose acquired by performing the real-time statistical collection by the dose channel module is greater than a dose threshold, the system is determined to be failed. In this case, the high voltage of the high voltage module is switched off.

The dose threshold is a product of a total dose and a ratio factor. In some embodiments, the ratio factor is greater than 1.

In some embodiments, after the dose radiation is completed, the device for controlling the dose switches off the pulse input and the high voltage of the high voltage module in the medical equipment by the dose channel module in the medical equipment. In some embodiments, the device for controlling the dose switches off the pulse input of the high voltage module by the dose channel module, and switches off the high voltage of the high voltage module by the central processor module, which is not limited in the embodiments of the present disclosure.

The method for controlling the dose in the embodiments of the present disclosure is described hereinafter by detailed implementation process.

Prior to therapy, the physicist or pharmacist develops the therapy plan of the patient based on the therapy plan module, and loads the therapy plan into a control system. The central processor module determines the speed at the control point based on the therapy plan, the rotation gantry, and the execution property of the multi-leaf grating and the dose system, and performs the linear interpolation to extend/divide two adjacent dose control points into a plurality of refined control points.

In some embodiments, in conjunction with Table 1, in the case that the gantry rotates to 5°, the central processor module divides the dose control point a to acquire the refined control point 1. In the case that the gantry rotates to 28°, the central processor module divides the dose control point a to acquire the refined control point 1 and the refined control point 2. In the case that the gantry rotates to 56°, the central processor module divides the dose control point a to acquire the refined control point 1, the refined control point 2, and the refined control point 3.

In the therapy process, the central processor module executes the refined control point 1, the dose compensation is not performed, and the dose is 10 Mu. The dose channel module integrates the actual dose based on a signal of an ionization chamber, and the pulse signal is switched off in response to the actual dose reaching 10 Mu. The pulse has been emitted when the pulse is witched off, and thus, the dose of one pulse is extra, and the actual dose is 10.1 Mu.

In the therapy process, the central processor module executes the refined control point 2, the dose compensation is performed on the dose at the refined control point 2, and a compensation value is equal to the target dose at the refined control point 1 minus the actual dose at the refined control point 1. As such, in the case that the target dose corresponding to the refined control point 2 is equal to the target dose at the refined control point 2 plus the compensation value, that is, the target dose corresponding to the refined control point 2 is equal to 20 plus (10-10.1), that is, 19.9 Mu, the central processor module sends the target dose at the refined control point 2 to the dose channel module, such that the dose channel module switches off the pulse input of the high voltage module in response to the actual dose of the dose channel module being greater than or equal to the target dose.

In the therapy process, the central processor module executes the refined control point 3, the dose compensation is performed on the dose at the refined control point 3, and a compensation value is equal to the target dose at the refined control point 2 minus the actual dose at the refined control point 2. As such, in the case that the target dose corresponding to the refined control point 3 is equal to the target dose at the refined control point 3 plus the compensation value, that is, the target dose corresponding to the refined control point 3 is equal to 30 plus (19.9-20.2), that is, 29.7 Mu, the central processor module sends the target dose at the refined control point 3 to the dose channel module, such that the dose channel module switches off the pulse input of the high voltage module in response to the actual dose of the dose channel module being greater than or equal to the target dose.

In the therapy process, the refined control points are sequentially executed until the refined control point 6 (that is, the last refined control point), and the dose compensation is not performed at the refined control point 6. That is, the target dose corresponding to the refined control point 6 is equal to the target dose at the refined control point 6.

After the therapy is completed, the dose channel module switches off the pulse input of the high voltage module, and the central processor module switches off the high voltage of the high voltage module.

For the first channel module and the second channel module, in the case that one of the dose channels is failed, the other of the dose channels stops the radiation normally. Thus, in the therapy process, the dynamic compensation is merely performed on the target dose of the first channel module, and the target dose of the second channel module is slightly greater than the dose at the last refined control point. For example, the target dose of the second channel module is equal to a product of 90 and the ratio factor. Thus, the second channel module is switched to the normal therapy. In the case that the second channel module is first switched, the system is determined to be failed.

In the embodiments of the present disclosure, each of the plurality of dose control points in the therapy plan is divided into the plurality of refined control points based on the gantry angle and/or the target dose at each of the plurality of dose control points, such that the accuracy of dividing the dose control points and the precision of sequentially performing the therapy plan are improved. Then, the target dose at the refined control point that is not executed is adjusted based on the actual dose at the refined control point that is executed, such that the actual dose at each of the plurality of dose control points is precisely controlled, and the total actual dose in the therapy process is further controlled. Thus, the precision and the accuracy of controlling the dose in the therapy process is further improved. The real-time statistical collection is performed on the actual dose at each of the plurality of refined control points by the dose channel module, such that the opportunity of switching off the pulse at each of the plurality of refined control points is determined. In the case that the actual dose at the target refined control point reaches to the target dose at the target refined control point, the pulse input of the high voltage module in the medical equipment is switched off by the dose channel module, such that the medical equipment stops outputting the dose, and the precision and accuracy of the radiation dose at each of the plurality of refined control points are further ensured.

Figure 7:
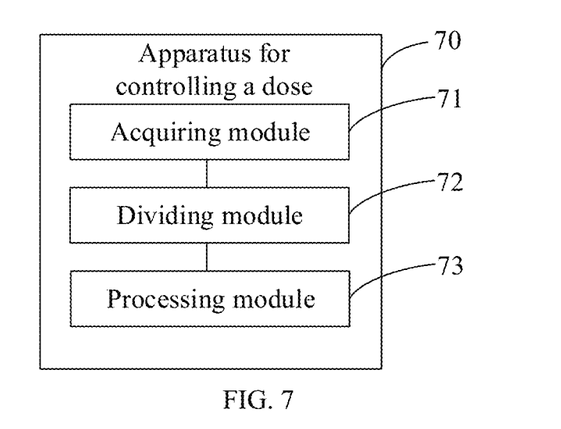
FIG. 7 is a schematic structural diagram of an apparatus for controlling a dose according to some embodiments of the present disclosure.

FIG. 7 is a schematic structural diagram of an apparatus for controlling a dose according to some embodiments of the present disclosure. As shown in FIG. 7, the apparatus for controlling the dose 70 includes: an acquiring module 71, a dividing module 72, and a processing module 73.

The acquiring module 71 is configured to acquire a therapy plan, wherein the therapy plan includes a plurality of dose control points.

The dividing module 72 is configured to divide each of the plurality of dose control points in the therapy plan into a plurality of refined control points.

Each of the plurality of refined control points corresponds to a target dose.

The processing module 73 is configured to perform the therapy plan, and perform a real-time statistical collection on an actual dose.

The processing module 73 is further configured to adjust, based on a target dose and the actual dose at a refined control point that is executed, a target dose at a refined control point that is not executed in real time.

The embodiments of the present disclosure provide a device for controlling a dose. Each of the plurality of dose control points is divided into the plurality of refined control points, and the therapy plan is performed based on the plurality of refined control points, that is, the dose is controlled for each of the plurality of dose control points. As such, the precision of performing the therapy plan is improved by subdividing the dose control points in the case. The target dose at the refined control point that is not executed is adjusted based on the actual dose at the refined control point that is executed, such that the actual dose at each of the plurality of dose control points is precisely controlled, and the total actual dose in the therapy process is further controlled. Thus, the precision and the accuracy of controlling the dose in the therapy process is further improved.

In some embodiments, the dividing module 72 is configured to acquire the gantry angle and the target dose at each of the plurality of dose control points in the therapy plan, and divide, based on the gantry angle and/or the target dose at each of the plurality of dose control points, each of the plurality of dose control points into the plurality of refined control points.

In some embodiments, the processing module 73 is configured to acquire a target dose at a previous refined control point that is executed, an actual dose at the previous refined control point that is executed, and a target dose at a current refined control point, and adjust, based on the target dose at the previous refined control point that is executed, the actual dose at the previous refined control point that is executed, and the target dose at the current refined control point that is not executed, the target dose at the current refined control point that is not executed in real time.

An adjusted target dose at the current refined control point that is not executed is equal to the target dose at the current refined control point that is not executed plus the target dose at the previous refined control point that is executed minus the actual dose at the previous refined control point that is executed. That is, as described above, the target dose corresponding to the $j^{th}$ refined control point is equal to the target dose at the $j^{th}$ refined control point plus the target dose corresponding to the $(j-1)^{th}$ refined control point minus the actual dose at the $(j-1)^{th}$ refined control point.

In some embodiments, for the plurality of refined control points of all of the plurality of dose control points, a target dose at a first refined control point and a target dose at a last refined control point are not adjusted.

In some embodiments, the apparatus for controlling the dose 70 further includes: a switching off module.

The processing module 73 is further configured to perform the real-time statistical collection on the actual dose by the dose channel module in the medical equipment.

The switching off module is configured to switch off, in response to the actual dose being greater than a dose threshold, a high voltage of the high voltage module by the dose channel module, such that the medical equipment stops outputting the dose. The dose threshold is a product of a total dose and a ratio factor, and the ratio factor is greater than 1.

In some embodiments, the apparatus for controlling the dose 70 further includes: the switching off module and a switching on module.

The switching off module is configured to switch off, in response to an actual dose at a target refined control point in the plurality of refined control points reaching a target dose at the target refined control point, a pulse input of the high voltage module by the dose channel module, such that the medical equipment stops outputting the dose.

The switching on module is configured to switch on, in executing a next refined control point of the target refined control point, the pulse input of the high voltage module by the dose channel module, such that the medical equipment starts to output the dose.

In some embodiments, the dose channel module includes a first channel module and a second channel module, and both the first channel module and the second channel module are configured to control the medical equipment to stop outputting the dose. For example, the first channel module is configured to switch off the pulse input of the high voltage module, and the second channel module is configured to switch off the high voltage of the high voltage module.

The apparatus for controlling the dose in the embodiments of the present disclosure is a device, or a member, integrated circuit, or chip of the medical equipment. The apparatus is a mobile electronic device, or a non-mobile electronic device.

The apparatus for controlling the dose in the embodiments of the present disclosure achieves processes in above method embodiments, and has the same technical effects, and thus, is not described in detail herein.

Figure 8:
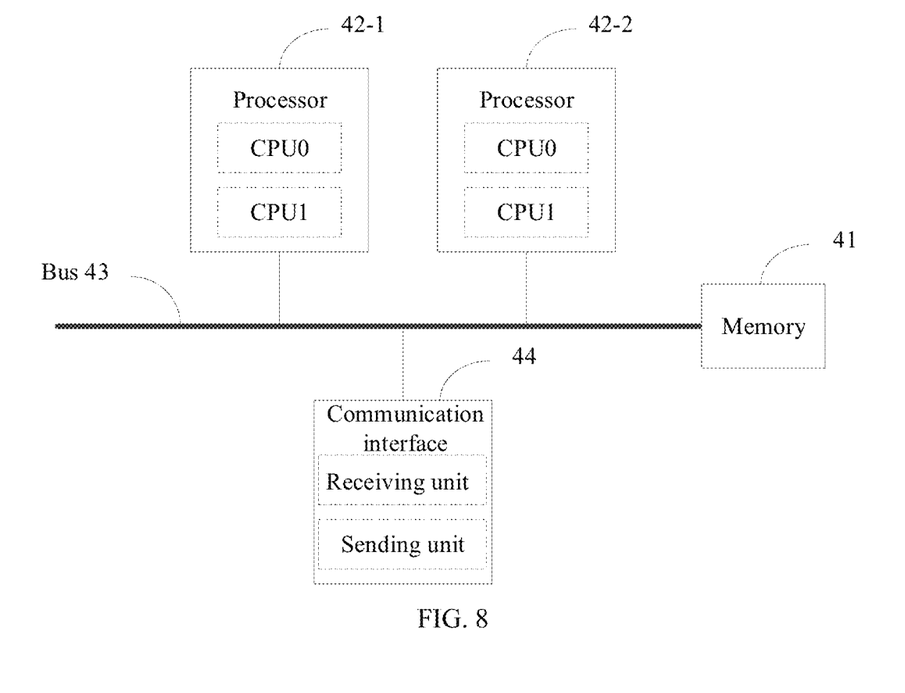
FIG. 8 is a schematic diagram of a hardware structure of medical equipment according to some embodiments of the present disclosure.

FIG. 8 is a schematic diagram of a hardware structure of medical equipment according to some embodiments of the present disclosure. The medical equipment includes a memory 41, a processor 42, a bus 43, and a communication interface 44. The memory 41 is configured to store computer-executable instructions, and the processor 42 is connected to the memory 41 by the bus 43. In the case that the medical equipment operates, the processor 42, when loading and executing the computer-executable instructions stored in the memory 41, causes the medical equipment to perform the method for determining the rotation speed of the gantry in above embodiments.

In some embodiments, the processor 42 includes one or more central processing units (CPU). For example, the processor 42 shown in FIG. 8 includes two central processing units: CPU0 and CPU1.

In some embodiments, the medical equipment includes a plurality of processors 42. For example, the medical equipment shown in FIG. 8 includes two processors: the processor 42-1 and the processor 42-2. In some embodiments, the CPU in the processor 42 is a single-CPU, or a multi-CPU. In some embodiments, the processor 42 is one or more devices, circuits, and/or processor cores for processing data (such as the computer-executable instructions).

In some embodiments, the memory 41 is a read-only memory (ROM) 41, other static memory used to store static information and instructions, random access memory (RAM), other dynamic memory used to store information and instructions, electrically erasable programmable read-only memory (EEPROM), compact disc read-only memory (CD-ROM), other compact disc memory, disc memory (such as, compact disc, laser disc, optical disc, digital versatile disc, and Blu-ray disc), magnetic disk storage media, other magnetic disk storage media, or any media that carries or stores program codes including instructions or data structures and is accessed by the computer, but is not limited in this. In some embodiments, the memory 41 is alone, and is connected to the processor 42 by the bus 43. In some embodiments, the memory 41 is integrated with the processor 42.

In some embodiments, the memory 41 is configured to store data in the embodiments of the present disclosure and perform computer-executable instructions corresponding to the software programs in the embodiments of the present disclosure. In some embodiments, the processor 42 achieves various functions of the medical equipment by executing or performing the software programs in the memory 41 and calling the data in the memory 41.

In some embodiments, the communication interface 44 uses devices such as transceiver, and is configured to communicate with other devices or communication networks, such as a control system, a radio access network (RAN), a wireless local area networks (WLAN), or the like. In some embodiments, the communication interface 44 includes: a receiving unit to implement a receiving function, and a sending unit to implement a sending function.

In some embodiments, the bus 43 is an industry standard architecture (ISA) bus, a peripheral component interconnect (PCI) bus, an extended industry standard architecture (EISA) bus, and the like. In some embodiments, the bus 43 includes an address bus, a data bus, a control bus, and the like. For convenience, FIG. 8 shows one thick line, which does not indicate only one or one kind bus.

In the embodiments of the present disclosure, a readable storage medium is further provided. The readable storage medium stores one or more programs or instructions, wherein the one or more programs or instructions, when loaded and executed by a processor, cause the processor to perform processes in the method for controlling the dose in above embodiments. In addition, the same technical effects are achieved, and thus, are not described in detail herein.

The processor is the processor in the medical equipment in above embodiments. The readable storage medium includes a computer-readable storage medium, for example, a read-only memory (ROM), a random-access memory (RAM), a disk, a disc, or the like.

A chip is provided in the embodiments of the present disclosure. The chip includes a processor and a communication interface, wherein the communication interface is coupled to the processor, and the processor, when loading and executing one or more programs or instructions, is caused to perform processes in the method for controlling the dose in above embodiments. In addition, the same technical effects are achieved, and thus, are not described in detail herein.

The chip in the embodiments of the present disclosure is also referred to as a system-on-chip, a system chip, a chip system, a system on chip, or the like.

It should be noted that, the terms "comprise," "include," or any other variations herein are intended to cover non-exclusive inclusion, such that a process, method, article or device including a series of elements includes those elements and other elements not expressly listed or inherent elements in such process, method, article or apparatus. Without further limitation, an element limited by the phrase "comprising one . . . " does not preclude the presence of other identical elements in the process, method, article or apparatus that includes the element. Furthermore, it should be noted that the scope of the method and apparatus in the embodiments of the present application is not limited to performing the functions in the shown or discussed order, and may also include performing the functions in a substantially simultaneous manner or in the reverse order based on the functions. For example, the method may be performed in an order different from that described, and various steps may also be added, omitted, or combined. In addition, features described with reference to some embodiments may be combined in other embodiments.

Based on the description in above embodiments, those skilled in the art can clearly understand that above embodiment method can be achieved by software and necessary general hardware platform, or hardware, but the former is better. On this basis, the nature or a part, contributing to the prior art, of the technical solutions of the embodiments of the present disclosure are described in the form of computer software products. The computer software product is stored in a storage medium (for example, a ROM/RAM, a magnetic disk, or an optical disc), and includes several instructions to cause a terminal (for example, a mobile phone, a computer, a server, a network device, or the like) to perform the method in the embodiments of the present disclosure.

The embodiments of the present disclosure are described above in conjunction with the accompany drawings, and are limited the above embodiments. Above embodiments are exemplary, and are not limiting. With the inspiration of the present disclosure, those of ordinary skill in the art can derive many forms without departing from the purpose of the present disclosure and the scope of protection of and the claims, which all belong to the protection of the present disclosure.

What is claimed is:

1. A method for controlling a dose, applicable to medical equipment, the method comprising:
   acquiring a therapy plan, wherein the therapy plan comprises a plurality of dose control points;
   dividing at least one dose control point of the plurality of dose control points in the therapy plan into a plurality of refined control points, wherein each of the plurality of refined control points corresponds to a target dose;
   performing the therapy plan, and performing a real-time statistical collection on an actual dose; and
   adjusting, based on a difference value between a target dose and the actual dose at a refined control point that is executed, a target dose at a refined control point that is not executed in real time,
   wherein adjusting, based on the difference value between the target dose and the actual dose at the refined control point that is executed, the target dose at the refined control point that is not executed in real time comprises:
   acquiring a target dose at a previous refined control point that is executed, an actual dose at the previous refined control point that is executed, and a target dose at a current refined control point; and
   adjusting, based on the target dose at the current refined control point that is not executed, and the difference value between the target dose at the previous refined control point that is executed and the actual dose at the previous refined control point that is executed, the target dose at the current refined control point that is not executed in real time,
   wherein an adjusted target dose at the current refined control point that is not executed is equal to the target dose at the current refined control point that is not executed plus the target dose at the previous refined control point that is executed minus the actual dose at the previous refined control point that is executed.

2. The method according to claim 1, wherein:
   each of the plurality of dose control points comprises a gantry angle and a target dose; and
   dividing at least one dose control point of the plurality of dose control points in the therapy plan into the plurality of refined control points comprises:
   acquiring the gantry angle and the target dose at the at least one dose control point of the plurality of dose control points in the therapy plan; and
   dividing, based on the gantry angle and/or the target dose at the at least one dose control point of the plurality of dose control points, the at least one dose control point of the plurality of dose control points into the plurality of refined control points.

3. The method according to claim 1, wherein for the plurality of refined control points, a target dose at a first refined control point and a target dose at a last refined control point are not adjusted, and the plurality of refined control points are consecutive.

4. The method according to claim 1, wherein:
   the medical equipment comprises a dose channel module and a high voltage module; and
   the method further comprises:
   performing the real-time statistical collection on the actual dose by the dose channel module; and
   switching off, in response to the actual dose being greater than a dose threshold, a high voltage of the high voltage module by the dose channel module, such that the medical equipment stops outputting the dose.

5. The method according to claim 4, wherein the dose threshold is a product of a total dose and a ratio factor, the ratio factor being greater than 1.

6. The method according to claim 1, wherein:
the medical equipment comprises a dose channel module and a high voltage module; and
the method further comprises:
switching off, in response to an actual dose at a target refined control point in the plurality of refined control points reaching a target dose at the target refined control point, a pulse input of the high voltage module by the dose channel module, such that the medical equipment stops outputting the dose; and
switching on, in executing a next refined control point of the target refined control point, the pulse input of the high voltage module by the dose channel module, such that the medical equipment starts to output the dose.

7. The method according to claim 6, further comprising: switching off, in response to the actual dose acquired by performing the real-time statistical collection by the dose channel module being greater than a dose threshold, a high voltage of the high voltage module by the dose channel module, such that the medical equipment stops outputting the dose;
wherein the dose channel module comprises: a first channel module and a second channel module; wherein both the first channel module and the second channel module are configured to control the medical equipment to stop outputting the dose, the first channel module is configured to switch off the pulse input of the high voltage module, and the second channel module is configured to switch off the high voltage of the high voltage module.

8. A device for controlling a dose, applicable to medical equipment, the device comprising: a processor, a memory, and one or more programs or instructions stored on the memory and executable on the processor, wherein the processor, when loading and executing the one or more programs or instructions, is caused to perform:
acquiring a therapy plan, wherein the therapy plan comprises a plurality of dose control points;
dividing at least one dose control point of the plurality of dose control points in the therapy plan into a plurality of refined control points, wherein each of the plurality of refined control points corresponds to a target dose;
performing the therapy plan, and performing a real-time statistical collection on an actual dose; and
adjusting, based on a difference value between a target dose and the actual dose at a refined control point that is executed, a target dose at a refined control point that is not executed in real time,
wherein the processor, when loading and executing the one or more programs or instructions, is caused to perform:
acquiring a target dose at a previous refined control point that is executed, an actual dose at the previous refined control point that is executed, and a target dose at a current refined control point; and
adjusting, based on the target dose at the current refined control point that is not executed, and the difference value between the target dose at the previous refined control point that is executed and the actual dose at the previous refined control point that is executed, the target dose at the current refined control point that is not executed in real time,
wherein an adjusted target dose at the current refined control point that is not executed is equal to the target dose at the current refined control point that is not executed plus the target dose at the previous refined control point that is executed minus the actual dose at the previous refined control point that is executed.

9. The device according to claim 8, wherein:
each of the plurality of dose control points comprises a gantry angle and a target dose; and
the processor, when loading and executing the one or more programs or instructions, is caused to perform:
acquiring the gantry angle and the target dose at the at least one dose control point of the plurality of dose control points in the therapy plan; and
dividing, based on the gantry angle and/or the target dose at the at least one dose control point of the plurality of dose control points, the at least one dose control point of the plurality of dose control points into the plurality of refined control points.

10. The device according to claim 8, wherein for the plurality of refined control points, a target dose at a first refined control point and a target dose at a last refined control point are not adjusted, and the plurality of refined control points are consecutive.

11. The device according to claim 8, wherein:
the medical equipment comprises a dose channel module and a high voltage module; and
the processor, when loading and executing the one or more programs or instructions, is caused to perform:
performing the real-time statistical collection on the actual dose by the dose channel module; and
switching off, in response to the actual dose being greater than a dose threshold, a high voltage of the high voltage module by the dose channel module, such that the medical equipment stops outputting the dose.

12. The device according to claim 11, wherein the dose threshold is a product of a total dose and a ratio factor, the ratio factor being greater than 1.

13. The device according to claim 8, wherein:
the medical equipment comprises a dose channel module and a high voltage module; and
the processor, when loading and executing the one or more programs or instructions, is caused to perform:
switching off, in response to an actual dose at a target refined control point in the plurality of refined control points reaching a target dose at the target refined control point, a pulse input of the high voltage module by the dose channel module, such that the medical equipment stops outputting the dose; and
switching on, in executing a next refined control point of the target refined control point, the pulse input of the high voltage module by the dose channel module, such that the medical equipment starts to output the dose.

14. The device according to claim 13, wherein the processor, when loading and executing the one or more programs or instructions, is caused to perform: switching off, in response to the actual dose acquired by performing the real-time statistical collection by the dose channel module being greater than a dose threshold, a high voltage of the high voltage module by the dose channel module, such that the medical equipment stops outputting the dose;
wherein the dose channel module comprises: a first channel module and a second channel module; wherein both the first channel module and the second channel module are configured to control the medical equipment to stop outputting the dose, the first channel module is configured to switch off the pulse input of the high voltage module, and the second channel module is configured to switch off the high voltage of the high voltage module.

15. Medical equipment, comprising:

a processor, and a memory configured to store one or more programs or instructions executable on the processor, wherein the processor, when loading and executing the one or more programs or instructions, is caused to perform:

acquiring a therapy plan, wherein the therapy plan comprises a plurality of dose control points;

dividing at least one dose control point of the plurality of dose control points in the therapy plan into a plurality of refined control points, wherein each of the plurality of refined control points corresponds to a target dose;

performing the therapy plan, and performing a real-time statistical collection on an actual dose; and adjusting, based on a difference value between a target dose and the actual dose at a refined control point that is executed, a target dose at a refined control point that is not executed in real time, wherein the processor, when loading and executing the one or more programs or instructions, is caused to perform:

acquiring a target dose at a previous refined control point that is executed, an actual dose at the previous refined control point that is executed, and a target dose at a current refined control point; and adjusting, based on the target dose at the current refined control point that is not executed, and the difference value between the target dose at the previous refined control point that is executed and the actual dose at the previous refined control point that is executed, the target dose at the current refined control point that is not executed in real time, wherein an adjusted target dose at the current refined control point that is not executed is equal to the target dose at the current refined control point that is not executed plus the target dose at the previous refined control point that is executed minus the actual dose at the previous refined control point that is executed.

16. A non-transitory computer-readable storage medium, storing one or more programs or instructions, wherein the one or more programs or instructions, when loaded and executed by a processor, cause the processor to perform the method for controlling the dose as defined in claim 1.

* * * * *